United States Patent
Choi et al.

(10) Patent No.: US 12,194,623 B2
(45) Date of Patent: Jan. 14, 2025

(54) ROBOT DEVICE INCLUDING ELASTIC OUTER COVER

(71) Applicant: SAMSUNG ELECTRONICS CO., LTD., Suwon-si (KR)

(72) Inventors: Heeseung Choi, Suwon-si (KR); Sungjin Park, Suwon-si (KR); Seunghwan Lee, Suwon-si (KR); Baeseok Lim, Suwon-si (KR); Woojong Cho, Suwon-si (KR); Kuyoung Choi, Suwon-si (KR); Hyoseok Na, Suwon-si (KR); Byounguk Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 671 days.

(21) Appl. No.: 17/434,539

(22) PCT Filed: Oct. 25, 2019

(86) PCT No.: PCT/KR2019/014165
§ 371 (c)(1),
(2) Date: Aug. 27, 2021

(87) PCT Pub. No.: WO2020/184805
PCT Pub. Date: Sep. 17, 2020

(65) Prior Publication Data
US 2022/0152848 A1    May 19, 2022

(30) Foreign Application Priority Data
Mar. 11, 2019    (KR) .................. 10-2019-0027294

(51) Int. Cl.
*B25J 19/00*    (2006.01)
*B25J 5/00*    (2006.01)
(Continued)

(52) U.S. Cl.
CPC ............ *B25J 19/0075* (2013.01); *B25J 5/007* (2013.01); *B25J 9/0003* (2013.01); *B25J 9/0009* (2013.01); *B25J 9/1005* (2013.01)

(58) Field of Classification Search
CPC ........ B25J 5/007; B25J 9/0003; B25J 9/0009; B25J 9/1005; B25J 19/0075
(Continued)

(56) References Cited

U.S. PATENT DOCUMENTS

| 2003/0110540 A1 | 6/2003 | Fukui et al. |
| 2007/0137905 A1 | 6/2007 | Lee et al. |

(Continued)

FOREIGN PATENT DOCUMENTS

| JP | 2003-117257 | 4/2003 |
| JP | 2005-013391 | 1/2005 |

(Continued)

OTHER PUBLICATIONS

International Search Report for PCT/KR2019/014165 dated Feb. 5, 2020, 5 pages.
(Continued)

*Primary Examiner* — Kevin Hurley
*Assistant Examiner* — Felicia L. Brittman-Alabi
(74) *Attorney, Agent, or Firm* — Nixon & Vanderhye P.C.

(57) ABSTRACT

According to various embodiments, a robot device comprises: a mast extending in one direction; a pivoting structure including a pivot mounted on one end portion of the mast and configured to pivot with respect to the mast; a casing accommodating at least a portion of the pivoting structure, and configured to linearly reciprocate with respect to the pivoting structure in a direction parallel or oblique to the direction in which the mast extends; and an elastic outer cover accommodating at least a portion of the mast, wherein the elastic outer cover may include a first portion fixed to the casing.

13 Claims, 10 Drawing Sheets

(51) Int. Cl.
  *B25J 9/00* (2006.01)
  *B25J 9/10* (2006.01)
(58) Field of Classification Search
  USPC .......................................................... 180/7.1
  See application file for complete search history.

(56) References Cited

U.S. PATENT DOCUMENTS

2015/0122073 A1    5/2015  Maisonnier
2020/0030706 A1*   1/2020  Hayashi .................. B25J 19/00

FOREIGN PATENT DOCUMENTS

| | | |
|---|---|---|
| JP | 2010-131676 | 6/2010 |
| JP | 2015-523221 | 8/2015 |
| KR | 10-0670202 | 1/2007 |
| KR | 10-2009-0069357 | 7/2009 |
| KR | 10-2012-0131260 | 12/2012 |
| KR | 10-2018-0020676 | 2/2018 |
| WO | 2018/190250 | 10/2018 |

OTHER PUBLICATIONS

Written Opinion of the ISA for PCT/KR2019/014165 dated Feb. 5, 2020, 6 pages.
Korean Office Action issued Jul. 17, 2023 in corresponding Korean Patent Application No. 10-2019-0027294.

* cited by examiner

ROBOT DEVICE INCLUDING ELASTIC OUTER COVER

CROSS-REFERENCE TO RELATED APPLICATIONS

This application is a national stage of International Application No. PCT/KR2019/014165 designating the United States, filed on Oct. 25, 2019, in the Korean Intellectual Property Receiving Office and claiming priority to Korean Patent Application No. 10-2019-002794 filed on Mar. 11, 2019, in the Korean Intellectual Property Office, the disclosures of which are incorporated by reference herein in their entireties.

BACKGROUND

Field

The disclosure relates to a robot device, for example, a robot device including an elastic outer cover.

Description of Related Art

In a smart home environment, various types of electronic devices that perform operations according to commands (e.g., voice or gesture commands) of family members and exchange emotion with users are being commercialized. For example, an artificial intelligence speaker used in the state of being mounted on a tabletop or a wall or a mobile robot device that performs a user's command while moving in a living space by including a traveling device may be usefully utilized in a user's daily life.

Mobile robot devices may have a structure moving in a simple traveling manner or a structure moving in a quadrupedal walking manner, and are expected to be also gradually implemented as a bipedal walking type that mimics the human body. As such mobile robot devices are converged with artificial intelligence technology, the smart home environment will be further evolved, and will be able to satisfy users' emotional needs, similarly to companion animals.

In order to secure mechanical stability, a rigid material case is used for the exterior of a mobile robot. In an example, the use of a joint structure may be required in order to implement a quadrupedal or bipedal walking manner, but with a rigid material exterior, it may be difficult to conceal such a joint structure. For example, in implementing an exterior using a rigid material case or the like, the joint area or the like may be exposed to the outside, which may result in deterioration of appearance. In an example, since the appearance of a rigid material does not provide a tactile sensation similar to that of a companion animal, there may be a limit in satisfying user sensibility.

SUMMARY

Embodiments of the disclosure provide a robot device including a outer cover capable of satisfying user sensibility in appearance.

Embodiments of the disclosure provide a robot device capable of performing various operations as well as traveling or moving.

Embodiments of the disclosure provide a robot device capable of preventing or alleviating a load that may be generated by a outer cover in an operation other than traveling or moving.

According to various example embodiments disclosed herein, a robot device may include: a mast extending in a direction; a pivoting structure including a pivot mounted on an end portion of the mast and configured to pivot with respect to the mast; a casing accommodating at least a portion of the pivoting structure and configured to linearly reciprocate with respect to the pivoting structure in a direction parallel or inclined to the direction in which the mast extends; and an elastic outer cover accommodating at least a portion of the mast and including a first portion fixed to the casing.

According to various example embodiments disclosed herein, a robot device may include: a base including a traveling device including a driving motor embedded therein; a mast mounted on the base to be movable linearly or curvilinearly and extending in a direction; a pivoting structure including a pivot mounted on one end portion of the mast and configured to pivot with respect to the mast; a head mounted on the mast and including a display; a casing accommodating at least a portion of the pivoting structure and configured to linearly reciprocate with respect to the pivoting structure in a direction parallel or inclined to the direction in which the mast extends; and an elastic outer cover including a first portion fixed to the casing and a second portion fixed to the base and accommodating the mast or the pivoting structure between the first portion and the second portion. The casing may include: a lower casing including a lower plate facing a lower surface of the pivoting structure and a side wall extending from the lower plate to define a space to accommodate the pivoting structure; and an upper casing having a plate shape fixed to an upper end of the side wall in a state of facing an upper surface of the pivoting structure.

According to various example embodiments disclosed herein, a robot device may include: a mast extending in a direction; a pivoting structure including a pivot mounted on one end portion of the mast and configured to pivot with respect to the mast; a casing accommodating at least a portion of the pivoting structure and configured to linearly reciprocate with respect to the pivoting structure in a direction parallel or inclined to the direction in which the mast extends; and an elastic outer cover including a first portion fixed to the casing and accommodating at least a portion of the mast. The pivoting structure may include: a first pivoting frame mounted on one end portion of the mast and configured to pivot with respect to the mast about a first axis perpendicular to the direction in which the mast extends; and a second pivoting frame mounted on the first pivoting frame and configured to pivot with respect to the first pivoting frame about a second axis perpendicular to the first axis, the second pivoting frame including at least one guide groove at an edge thereof. The casing may include: a lower casing including a lower plate facing the lower surface of the pivoting structure, a sidewall extending from the lower plate to define a space for accommodating the pivoting structure, and at least one guide protrusion protruding from the inner surface of the side wall and extending in a direction in which the casing linearly reciprocates; and an upper casing having a plate shape and fixed to the upper end of the side wall in the state of facing the upper surface of the pivoting structure. The guide protrusion may be engaged with the guide groove so as to guide the linear reciprocating of the casing.

According to various example embodiments disclosed herein, the outer cover is made of an elastic material such as silicone. Thus, it is possible for the exterior of the robot device to provide a visually and tactilely softer texture than an exterior made of a rigid material. For example, it is possible to stimulate a user's emotion through contact with the user while communicating with the user or performing the user's command. In an example embodiment, the robot device is equipped with an elastic outer cover using a pivoting structure or a casing that linearly reciprocates linearly with respect to the pivoting structure. Thus, it is possible to prevent or alleviate a load that may be generated by the outer cover in a motion other than traveling or displacing. For example, it is possible to alleviate a repulsive force generated by the deformation of the elastic outer cover using the pivoting structure or casing mounted on the mast.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
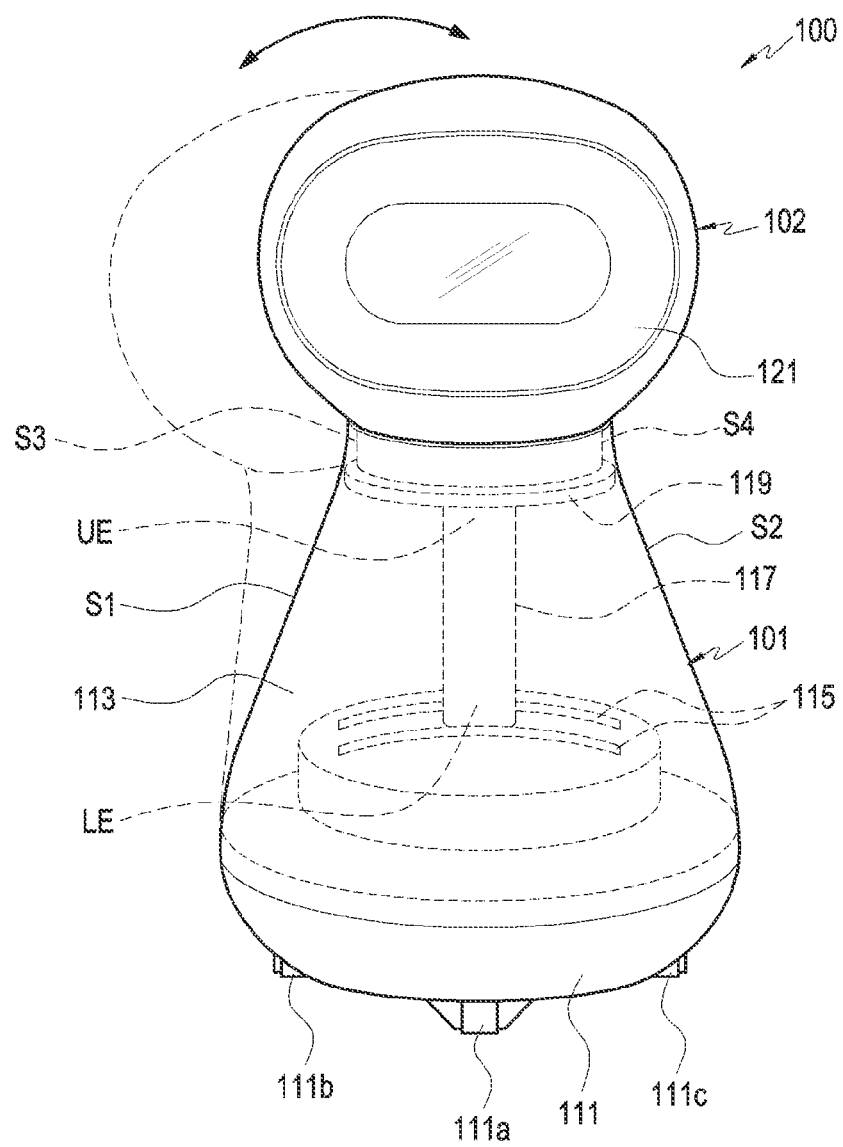
FIG. 1 is a perspective view illustrating a robot device according to various embodiments.

The disclosure may be variously modified and may have various embodiments, some of which will be described in detail with reference to the accompanying drawings. However, it is to be understood that this is not intended to limit the disclosure to specific embodiments, and all the modifications, equivalents, and substitutions fall within the spirit and scope of the disclosure.

In connection with the description of the drawings, similar or related components may be denoted by similar reference numerals. The singular form of a noun corresponding to an item may include one or more of the items unless the context clearly indicates otherwise. Herein, each of phrases, such as "A or B", "at least one of A and B", "at least one of A or B", "A, B, or C", "at least one of A, B, and C", and "at least one of A, B, or C", may include all possible combinations of items listed together in the corresponding one of the phrases. Terms including ordinal numbers, such as "first" and "second", may be used to describe various elements, but the elements are not limited by the terms. These terms are used only for the purpose of distinguishing one component from another. For example, without departing from the scope of the disclosure, a first component may be referred to as a second component, and similarly, a second component may also be referred to as a first component. The term "and/or" includes a combination of a plurality of related listed items or any of a plurality of related listed items. When one (e.g., a first) component is mentioned as being "coupled" or "connected" to another (e.g., a second) component, with or without the term "functionally" or "communicatively", the one component may be connected to the another component directly (e.g., in a wired manner), wirelessly, or via a third component.

In addition, relative terms described with reference to an object shown in the drawings, such as "front", "rear", "top", and "bottom", may be replaced with ordinal numbers such as "first" and "second". In ordinal numbers such as "first" and "second", the order is determined in the mentioned order or arbitrarily, and may be arbitrarily changed as necessary.

The terms used herein are only used to describe specific embodiments, and are not intended to limit the disclosure. An expression in a singular form includes an expression in a plural form as well, unless the context clearly indicates otherwise. It should be understood that terms, such as "comprise" and "have", used herein are intended to specify the presence of stated features, numbers, steps, operations, elements, components, or combinations thereof, but are not intended to preclude in advance the presence or addition of one or more other features, numbers, steps, operations, steps, elements, components, or combinations thereof.

Unless otherwise defined, all terms used herein, including technical or scientific terms, have the same meaning as commonly understood by a person ordinarily skilled in the art to which the disclosure belongs. Terms, such as those defined in a commonly used dictionary, should be interpreted as having a meaning consistent with the meaning in the context of the related art, and should not be interpreted in an ideal or excessively formal meaning unless explicitly defined herein.

Herein, the robot device may be any device including a touch panel, and is capable of performing at least some of operations implemented by a smartphone, a mobile phone, a navigation device, a game machine, a TV, a vehicle head unit, a notebook computer, a laptop computer, a tablet computer, a personal media player (PMP), a personal digital assistance (PDA), or the like.

The robot device may communicate with an external electronic device, such as a server, or may perform a task through interworking with an external electronic device. For example, the robot device may transmit an image captured using a camera and/or location information detected by a sensor unit to a server through a network. The network may be, but is not limited to, a mobile or cellular network, a local area network (LAN), a wireless local area network (WLAN), a wide area network (WAN), the Internet, a small area network (SAN), or the like.

FIG. 1 is a perspective view illustrating a robot device 100 according to various embodiments.

Referring to FIG. 1, the robot device 100 may be a mobile robot device implemented in a simple driving type. In an embodiment, the robot device 100 may include a body portion 101 providing an appearance in which a base 111 and an elastic outer cover 113 are combined, and a head 102 mounted at the upper end of the body portion 101. In an embodiment, a guide rail 115 and a mast 117 that move linearly or curvilinearly while being guided by the guide rail 115 may be mounted inside the body portion 101, and the elastic outer cover 113 is partially deformable according to the movement of the mast 117.

According to various embodiments, the base 111 may include a traveling device. The traveling device may includes a plurality of wheels 111a, 111b, and 111c and a driving device (e.g., a servo motor) that rotates at least one of the plurality of wheels 111a, 111b, and 111c. For example, the robot device 100 may move an allowed area in the user's living space. Although not illustrated, a battery for supplying power, a memory storing various programs such as user commands, a processor for executing the programs stored in the memory, and various sensors (e.g., a proximity sensor, an illuminance sensor, and a temperature/humidity sensor) for collecting peripheral information necessary to execute the user commands, an audio module for input or output of sound, a communication module or interface for performing communication with other electronic devices or networks, etc. may be embedded in the base 111.

According to various embodiments, a pair of guide rails 115 may be disposed on the top surface of the base 111 so as to define a trajectory for moving the mast 117. In an embodiment, the head 102 may be mounted on the mast 117 so as to be movable with respect to the base 111 according to the movement of the mast 117. The guide rails 115 may have a linear shape or a curved shape, and the mast 117 is movable linearly or curvilinearly on the base 111 depending on the shape of the guide rails 115.

According to various embodiments, when the guide rails 115 have a linear shape, the head 102 is movable with respect to the base 111 within a range allowed by the guide rail 115 (e.g., the length of the guide rails 115). In an embodiment, when the guide rails 115 have a curved shape, the range in which the head 102 is moveable may be greater than the range in which the mast 117 is movable on the guide rails 115. For example, as illustrated in FIG. 1, when the guide rails 115 has a curved shape with a central portion higher than both ends, the range in which the upper end (UE) of the mast 117 is movable may be greater than the range in which the lower end (LE) is movable. In some embodiments, when the guide rails 115 have a curved shape, even if the base 111 is miniaturized, the head 102 is movable relative to the base 111 in a range sufficient to be visually recognized by a user.

According to various embodiments, the head 102 may include a display 121 for outputting visual information. When a user's voice command is recognized or the presence of the user is recognized, the robot device 100 may make the display 121 direct toward the user. For example, the robot device 100 may make the display 121 direct toward the user by driving the traveling device of the base 111 or rotating the head 102 with respect to the base 111. In an embodiment, at least some of the various sensors of the robot device 100 may be embedded in the head 102. For example, the illuminance sensor may be disposed on the top surface of the head 102 to more accurately detect ambient brightness and the like. When a sound hole is disposed in the top surface of the head 102 for input or output of sound, it is possible to acquire or output sound that is uniform in quality in all directions. If it is desired to implement a stereo or three-dimensional effect in the input or output of sound, it is possible to acquire or output sound having higher power in the direction in which the sound hole is arranged by arranging the sound hole on in the head 102 or the side surface of the base 111. In an embodiment, a mechanical button, a touch panel, or a pressure sensor may be disposed on at least a portion of the surface of the head 102. For example, at least a portion of the surface of the head 102 may be an area in which an input device is disposed.

According to various embodiments, the elastic outer cover 113 may be made of, for example, an elastic material such as silicone. For example, unlike a rigid metal or synthetic resin material, the elastic outer cover 113 may provide a soft touch to the user, thereby providing a visual or tactile feeling different from that of a robot device made of a rigid material. According to an embodiment, the elastic outer cover 113 may be fixed to each of the upper end of the mast 117 and the base 111. For example, the upper end of the elastic outer cover 113 may be coupled to the upper end of the mast 117, and the lower end may surround a portion of the base 111. According to an embodiment, a casing 119 may be mounted on the upper end of the mast 117, and the upper end of the elastic outer cover 113 may be coupled to surround the casing 119. In an embodiment, the casing 119 may be mounted on the mast 117 via a pivoting structure (e.g., the pivoting structure 202 in FIG. 2 or FIG. 6) to be described later, and may linearly reciprocate with respect to the pivoting structure 202.

According to various embodiments, when the mast 117 moves on the base 111, or when the head 102 moves with respect to the base 111, the elastic outer cover 113 is deformable. When the elastic outer cover 113 is deformed by an external force, the elastic outer cover 113 is capable of generating a repulsive or restoring force against the external force, and the repulsive or restoring force of the elastic outer cover 113 is capable of acting as a load applied to other structures. In an embodiment, as in FIG. 1, when the head 102 moves to the left according to the movement of the mast 117, it is possible for the left portion S1 of the elastic outer cover 113 to generate a repulsive force to move or restore the upper end thereof to the right, and it is also possible for the right portion S2 of the elastic outer cover 113 to generate a repulsive force to move or restore the upper end thereof to the right.

According to various embodiments, the repulsive force generated by the elastic outer cover 113 may act as a load on the driving device for moving the mast 117 or the head 102. According to various embodiments disclosed herein, the casing 119 may rotate or linearly reciprocate in various directions on the mast 117 so as to alleviate the repulsive force generated by the elastic outer cover 113. For example, as illustrated in FIG. 1, when the head 102 moves to the left, the casing 119 may rotate on the mast 117 to move the left end S3 upwards and to move the right end S4 downwards. The repulsive force according to the deformation of the elastic outer cover 113 may be reduced while rotating or linearly reciprocating the casing 119. For example, the casing 119 may rotate by a partial displacement or deformation generated in the elastic outer cover 113 according to the movement of the mast 117 or the head 102 so as to at least partially restore the elastic outer cover 113, thereby alleviating the repulsive force caused by the deformation.

The structure in which the casing 119 rotates or linearly reciprocates on the mast 117 will be described in more detail with reference to FIGS. 2 to 4. In discussing various embodiments below, reference may be made to the drawings of the preceding embodiments for brevity of description. For the configurations that are the same as or easily understood through the preceding embodiments, the same reference numerals as those used in the preceding embodiments may be assigned or omitted, and detailed descriptions thereof may also be omitted. In addition, various expressions, such as "mounted", "fixed", "coupled", and "arranged", will be used in describing the relative movement between the components or the correlation with respect to a fixing structure, a description of the fastening elements, such as a screw, may be omitted. A person skilled in the art will readily understand the structure in which the relative movement between respective components is possible or the structure in which respective components are fixed so as to be immovable relative to each other is fixed with reference to the detailed description.

Figure 2:
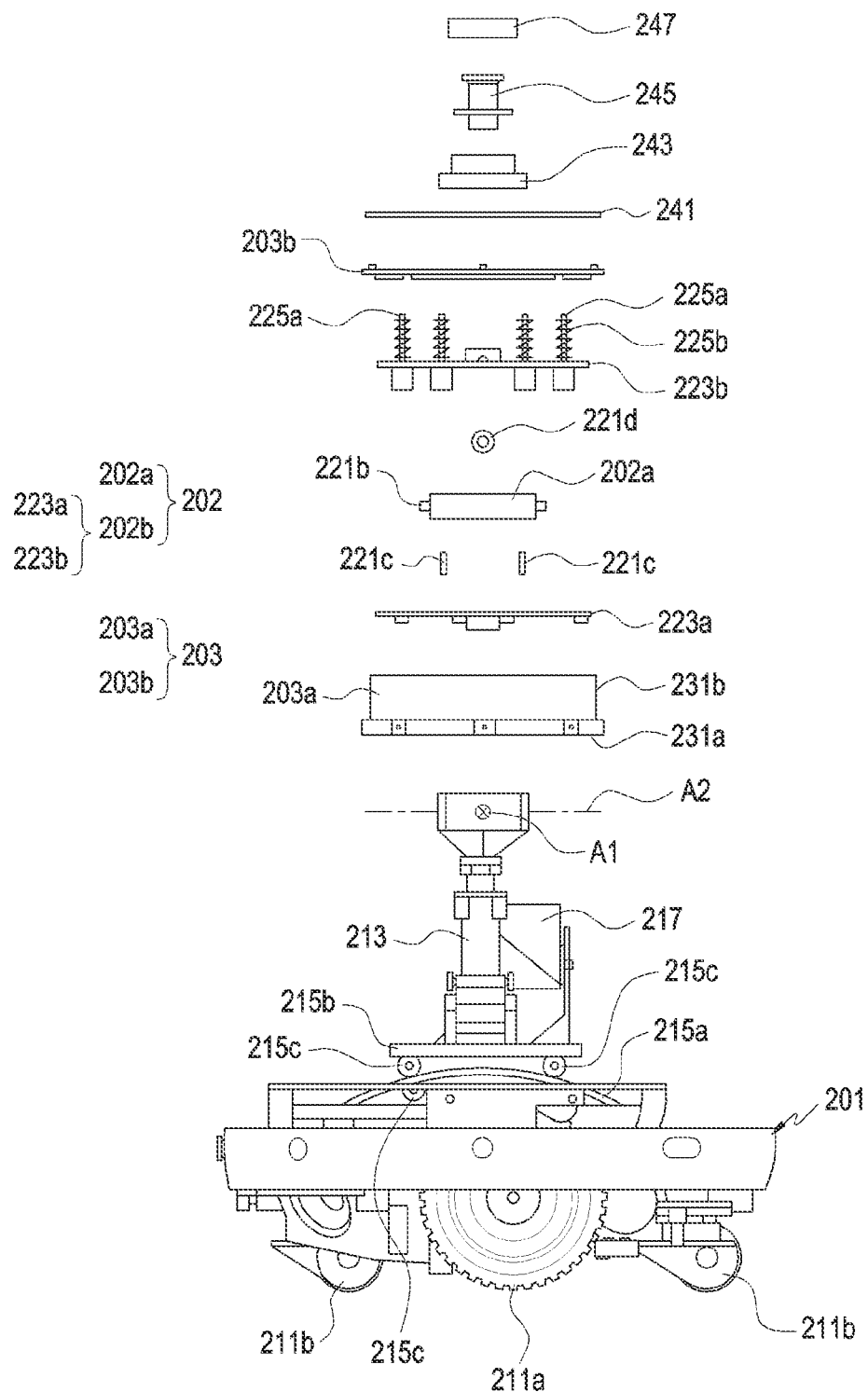
FIG. 2 is an exploded side view illustrating a robot device according to various embodiments.

FIG. 2 is an exploded side view illustrating a robot device (e.g., the robot device 100 of FIG. 1) in a state of being partially disassembled according to various embodiments. FIG. 3 is an exploded perspective view illustrating a part of a robot device (e.g., the robot device 100 in FIG. 1) according to various embodiments. FIG. 4 is an exploded perspective view for explaining the state in which an elastic outer cover 209 of a robot device (e.g., the robot device 100 in FIG. 1) is assembled according to various embodiments.

Figure 3:
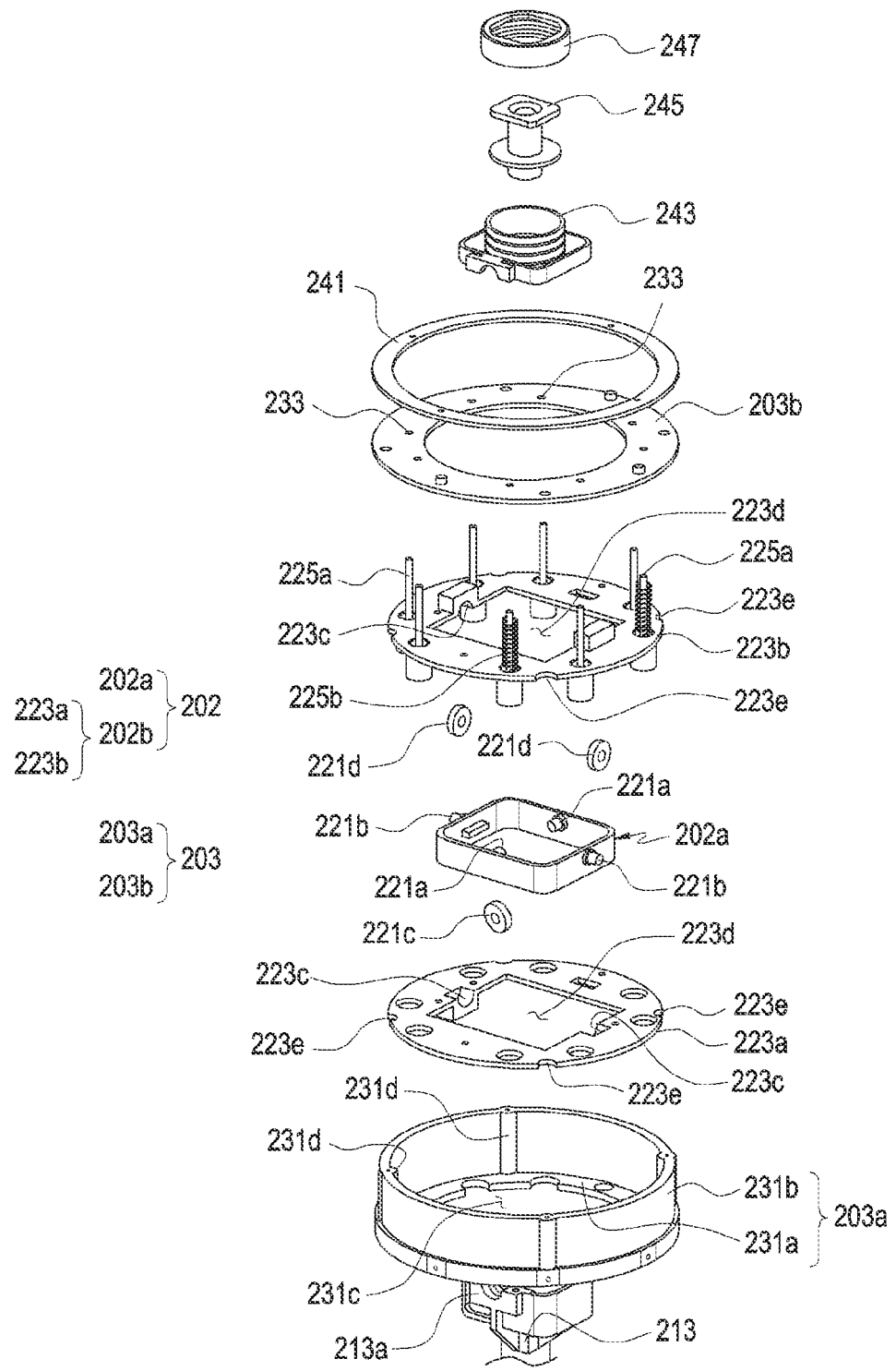
FIG. 3 is an exploded perspective view illustrating a part of a robot device according to various embodiments.
Figure 4:
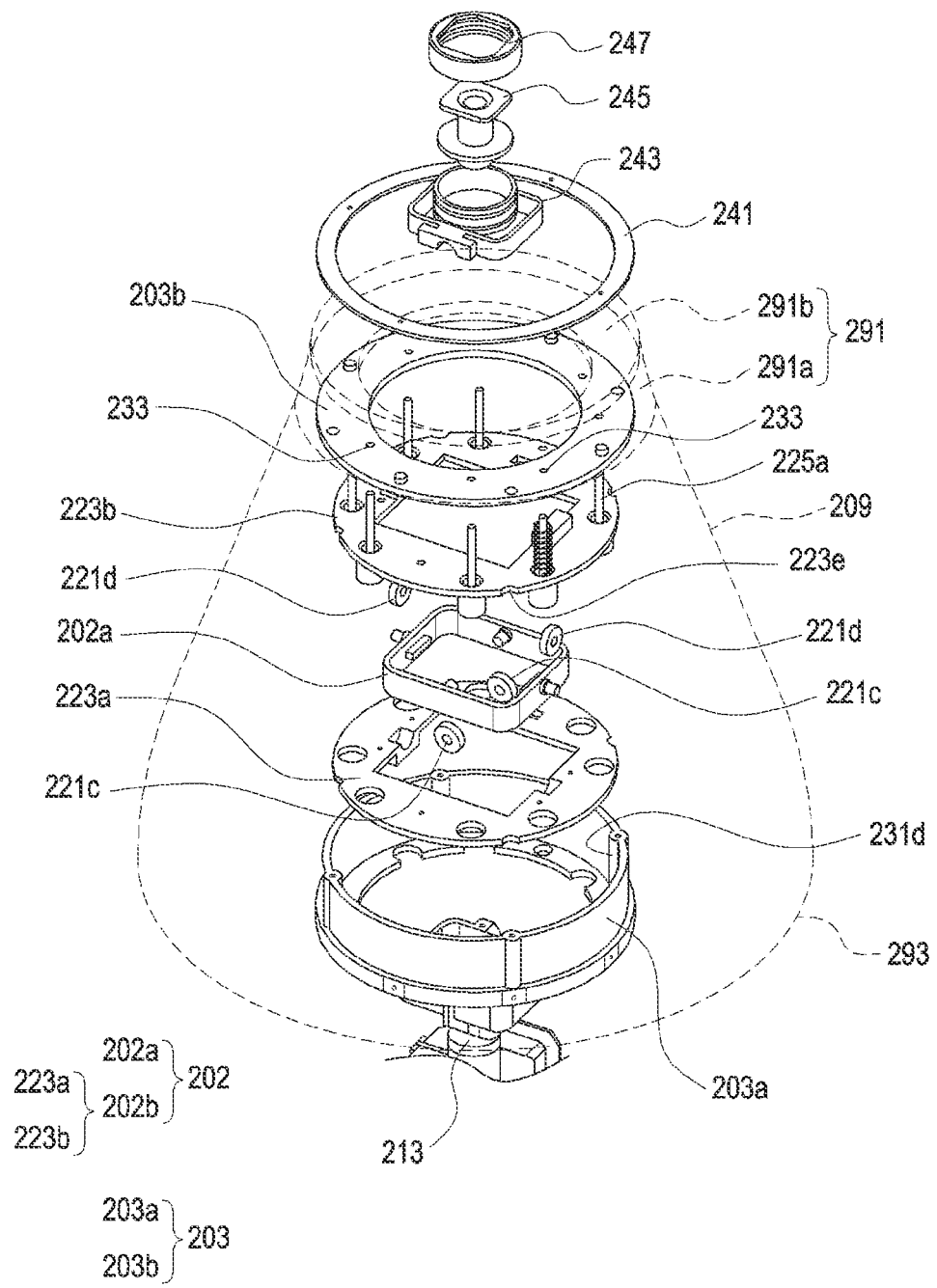
FIG. 4 is an exploded perspective view for explaining the state in which an elastic outer cover of a robot device is assembled according to various embodiments disclosed.

Referring to FIGS. 2 to 4, the robot device 100 includes a base 201 (e.g., the base in FIG. 1), a mast 213 (e.g., the mast 117 in FIG. 1), and a pivoting structure 202, and a casing 203 (e.g., the casing 119 in FIG. 1). In an embodiment, the robot device 100 may further include a first fixing member 243, so that the pivoting structure 202 can be rotatably mounted on the mast 213. In an embodiment, the robot device 100 may further include a second fixing member 245 or a third fixing member 247, so that a head (e.g., the head 102 in FIG. 1) can be mounted on the mast 213 or the first fixing member 243. In some embodiments, the third fixing member 247 may be rotatably coupled to the second fixing member 245 while being fixed to the head 102. For example, the head 102 may rotate on the mast 213 about a rotation axis parallel to the direction in which the mast 213 extends. In an embodiment, the mast 213 may be made of a hollow tube, and the inner space provided by the mast 213 may be connected to the inner space of the head 102. For example, the mast 213 may provide a space for a power wiring line or various signal wiring lines connecting the base 201 and the head 102 to each other.

According to various embodiments, the base 201 may include a traveling device. The traveling device of the base 201 may include a plurality of wheels 211a and 211b protruding to the outside from the bottom of the base 201. For example, on the bottom of the base 201, at least one driving wheel 211a rotated by a driving motor and a guide wheel(s) 211b that enables smooth traveling while maintaining the distance between the plane on which the robot device 100 is mounted and the base 201 may be provided. The robot device 100 may move in the user space by rotating the driving wheel 211a. When a plurality of the driving wheels 211a are provided, the robot device 100 may control the orientation direction by differently controlling or rotating respective driving wheels.

Figure 5:
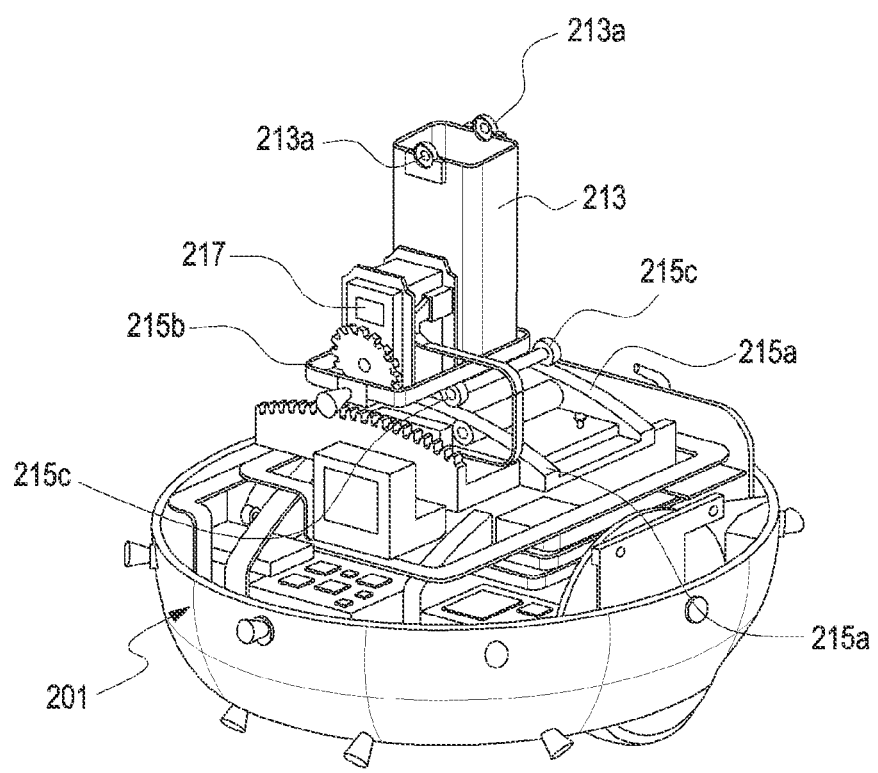
FIG. 5 is a perspective view illustrating a base of a robot device according to various embodiments.

The structure of the base 201 will be described with further reference to FIG. 5. FIG. 5 is a perspective view illustrating the base 201 of a robot device (e.g., the robot device 100 in FIG. 1) according to various embodiments.

Referring to FIGS. 2 and 5, curved guide rails 215a (e.g., the guide rails 115 in FIG. 1) and a guide platform 215b moving along the guide rails 215a may be disposed on the top surface of the base 201. The guide platform 215b may include a plurality of rollers 215c, and by rotating the rollers 215c in the state of being in contact with the guide rails 215a, it is possible to move the guide platform 215b. According to an embodiment, the plurality of rollers 215c may be disposed to contact the top and bottom surfaces of the guide rails 215a, respectively. For example, the guide platform 215b may be coupled to the guide rails 215a via the rollers 215c, and may move along a trajectory provided by the guide rails 215a using the rollers 215c.

According to various embodiments, by being mounted on the guide platform 215b, the mast 213 is movable with respect to the base 201 within a range allowed by the guide rails 215a. In an embodiment, the mast 213 may be disposed to extend in one direction, for example, upwards from the guide platform 215b. In an embodiment, the mast 213 may be manufactured substantially integrally with the guide platform 215b. In some embodiments, a driving device 217 (e.g., a servo motor) may be mounted on the mast 213, and the mast 213 or the guide platform 215b is movable along the guide rails 215a according to the operation of the driving device 217. According to an embodiment, the mast 213 may include at least one first bearing pocket 213a disposed at the upper end thereof. As will be described later, the first pivoting frame 202a of the pivoting structure 202 may be mounted on the mast 213 via the first bearing pocket 213a and may pivot or rotate about a first axis A1 with respect to the mast 213.

Referring back to FIGS. 2 to 4, the pivoting structure 202 may include a first pivoting frame 202a and a second pivoting frame 202b, and may be mounted on one end of the mast 213. The first pivoting frame 202a may have a closed curve shape or a tube shape surrounding the upper end of the mast 213, and may include first bearing protrusions 221a protruding from the inner surface thereof and second bearing protrusions 221b protruding from the outer surface thereof. According to an embodiment, the first bearing protrusions 221a may be coupled to the first bearing pocket 213a via a first bearing 221c. For example, the first bearing 221c may be accommodated in the first bearing pocket 213a in the state of being mounted on the first bearing protrusion 221a. In an embodiment, the first pivoting frame 202a is pivotable about the mast 213 via the first bearing 221c by being mounted on the mast 213 via the first bearing 221c.

According to an embodiment, the second pivoting frame 202b may have a flat plate shape including an opening 223d, which accommodates the first pivoting frame 202a. According to an embodiment, the second pivoting frame 202b has a substantially circular flat plate shape, and may be completed by coupling the first plate 223a and the second plate 223b to face each other. According to an embodiment, the second pivoting frame 202b may include second bearing pockets 223c disposed adjacent to the opening 223d. Practically, the second bearing pocket 223c may be completed when the first plate 223a and the second plate 223b are coupled to each other. The second bearing pocket 223c may receive the second bearing protrusions 221b in a rotatable state. For example, in the state in which the second bearing 221d is mounted on the second bearing protrusions 221b, the first plate 223a and the second 223b may be coupled to each other such that the second bearing 221d is accommodated in the second bearing pocket 223c. According to an embodiment, the second pivoting frame 202b may rotate or pivot with respect to the first pivoting frame 202a about a second axis A2 perpendicular to the first axis A1. For example, the second pivoting frame 202b may pivot with respect to the first pivoting frame 202a about the second axis A2 while pivoting with respect to the mast 213 about the axis A1 together with the first pivoting frame 202a.

The pivoting structure 202 may be mounted on the mast 213 in the state of being coupled to the casing 203 (e.g., the casing 119 in FIG. 1) or before being coupled to the casing 203. A configuration for mounting the pivoting structure 203 will be further described with reference to FIG. 6.

Figure 6:
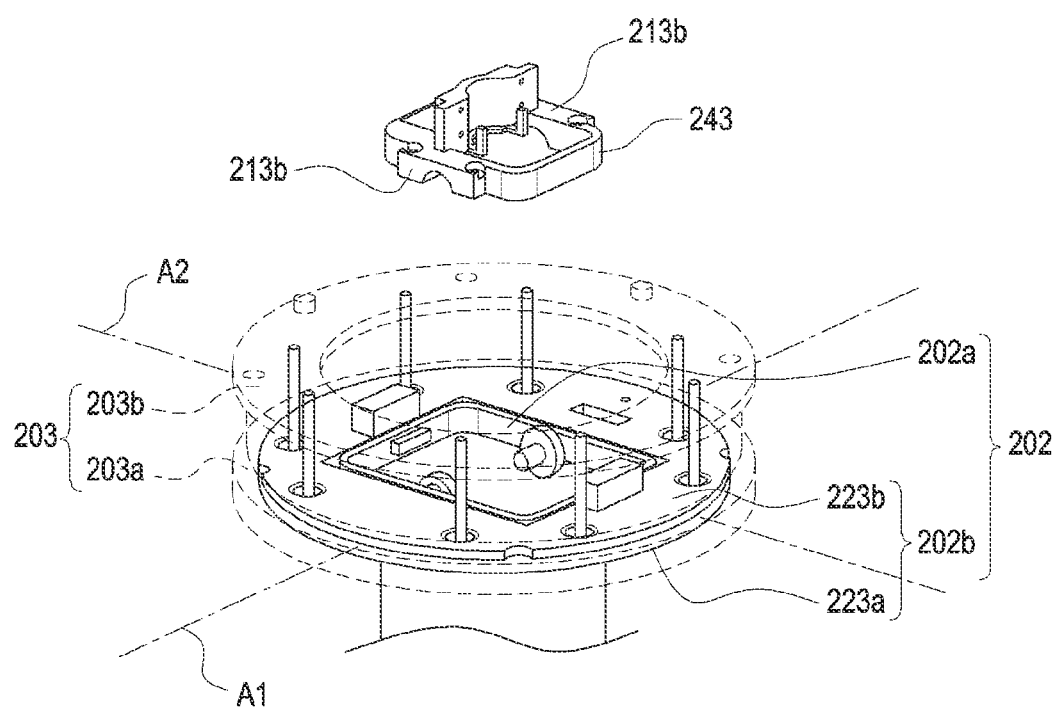
FIG. 6 is a perspective view for explaining the configuration in which a pivoting structure is mounted in a robot device according to various embodiments.

FIG. 6 is a perspective view for explaining the configuration in which the pivoting structure 202 is mounted in a robot device (e.g., the robot device 100 in FIG. 1) according to various embodiments.

Further referring to FIG. 6, in the state in which the pivoting structure 202 is disposed on the mast 213, for example, in the state in which the first pivoting frame 202a is coupled to the first bearing pocket 213a via the first bearing 221c, the first fixing member 243 may be mounted on the upper end of the mast 213. According to an embodiment, the first fixing member 243 may include another bearing pocket 213b configured to accommodate a portion of the first bearing 221c. For example, when the first fixing member 243 is coupled to the upper end of the mast 213, the first bearing 221c or the first pivoting frame 202a may be constrained to the mast 213 in a pivotable state.

According to various embodiments, the casing 203 may include a lower casing 203a and an upper casing 203b, and may be coupled to the pivoting structure 202 while accommodating at least a portion of the pivoting structure 202. For example, the casing 203 is rotatable with respect to the mast 213 substantially together with the pivoting structure 202. According to an embodiment, the casing 203 may linearly reciprocate with respect to the pivoting structure 202. For example, in the state illustrated in FIG. 1, the casing 203 (e.g., the casing 119 in FIG. 1) is capable of linearly reciprocating in a vertical direction, for example, in a direction parallel to the direction in which the mast 213 extends. In an embodiment, depending on the position to which the mast 213 is moved on the base 201, the pivoting structure 202 may be inclined with respect to the mast 213. When the pivoting structure 202 is in the state of being inclined with respect to the mast 213, the casing 203 may linearly reciprocate in a direction inclined with respect to the direction in which the mast 213 extends. In an embodiment, when viewed with respect to the base 201, the direction in which the casing 203 linearly reciprocates may vary depending on the angle or position to which the pivoting structure 202 is rotated. In some embodiments, apart from the movement of the mast 213, the pivoting structure 202 may pivot with respect to the mast 213 or the casing 203 may linearly move with respect to the pivoting structure 202 depending on an external force applied to the elastic outer cover 209 (e.g., the elastic outer cover 113 in FIG. 1).

According to various embodiments, the lower casing 203a may provide a space 231c configured to accommodate the pivoting structure 202 by including a lower plate 231a and a side wall 231b. According to an embodiment, the lower plate 231a may be disposed so as to face a lower surface of the pivoting structure 202, for example, the first plate 223a. The side wall 231b may extend from the lower plate 231a and may be disposed to surround the circumference of the pivoting structure 202. For example, the side wall 231b may substantially define the space 231c together with the lower plate 231a.

According to various embodiments, the upper casing 203b has a plate shape mounted on or fixed to the upper end of the side wall 231b, and may be disposed so as to face the upper surface of the pivoting structure 202, for example, the second plate 223b. In an embodiment, if the pivoting structure 202 is in the state of being mounted on the mast 213, the casing 203 may linearly reciprocate with respect to the pivoting structure 202. For example, the pivoting structure 202 may linearly reciprocate between the lower plate 231a and the upper casing 203b. When the casing 203 is coupled with the pivoting structure 202 in the state of accommodating the pivoting structure 202, the casing 203 is pivotable with respect to the first axis A1 or the second axis A2. For example, the casing 203 is capable of linearly reciprocating with respect to the pivoting structure 202 while pivoting with respect to the mast 213.

According to various embodiments, at least one elastic member 225b may be disposed between the pivoting structure 202 (e.g., the second plate 223b) and the upper casing 203b. For example, the range in which the pivoting structure 202 is linearly movable within the casing 203 may be smaller than the distance between the lower plate 231a and the upper casing 203b. According to an embodiment, in order to dispose the elastic member 225b, the robot device 100 may include at least one support pin 225a extending from the pivoting structure 202 (e.g., the second plate 223b) in the direction in which the casing 203 linearly reciprocates. The elastic member 225b may include, for example, a compression coil spring wound around the support pin 225a. In the linear reciprocating movement direction of the casing 203, the elastic member 225a may provide an elastic force acting in a direction of moving the upper casing 203b away from the pivoting structure 202 (e.g., the second plate 223b). In some embodiments, one end of the elastic member 225b is supported on the pivoting structure 202 (e.g., the second plate 223b), and the other end is supported on the upper casing 203b so that the elastic member 225b is capable of providing an elastic force to move the upper casing 203b and the pivoting structure 202 away from each other.

According to various embodiments, when the casing 203 or the pivoting structure 202 linearly reciprocate with respect to each other, the support pin 225a may interfere with the upper casing 203b. In an embodiment, the robot device 100 may include at least one avoidance hole 233 penetrating the upper casing 203b, thereby preventing the support pin 225a from interfering with the upper casing 203b. For example, a portion of the support pin 225a may be accommodated in the avoidance hole 233, and when the casing 203 or the pivoting structure 202 linearly reciprocate with respect to each other, the support pin 225a may protrude to the outside of the casing 203 through the avoidance hole 233. In providing an elastic force between the second plate 223b and the upper casing 203b, either end of the elastic member 225b may be supported around the avoidance hole 233.

In an embodiment, a structure in which the support pin 225a is disposed in the pivoting structure 202 (e.g., the second plate 223b) and the avoidance hole 233 is provided in the upper casing 203b is disclosed, but it is noted that the various embodiments disclosed in this document are not limited thereto. For example, the support pin 225a may extend downwards from the upper casing 203b, and the avoidance hole 233 may be provided in the pivoting structure 202. Modifications regarding the arrangement of support pins (e.g., the support pins 225a) and the avoidance holes (e.g., the avoidance holes 233) will be described with reference to FIG. 8 or FIG. 9.

According to various embodiments, the elastic force provided to the upper casing 203b or the pivoting structure 202 by the elastic member 225b may be smaller than the repulsive force generated by the elastic outer cover 209 (e.g., the elastic outer cover 119 in FIG. 1) against an external force. For example, the casing 203 to which the repulsive force of the elastic outer cover 209 acts is linearly movable with respect to the pivoting structure 202, and the elastic outer cover 209 is capable of reducing the repulsive force while being restored to some extent according to the linear movement of the casing 209. In an embodiment, if an external force or the repulsive force of the elastic outer cover 209 does not act, the casing 203 may maintain a stationary state at the position where the lower plate 231a is in contact with the first plate 223a.

According to various embodiments, the robot device 100 may include a guide structure configured to guide the linear reciprocating of the casing 203. For example, at least one guide groove 223e may be provided at an edge of the pivoting structure 202, and at least one guide protrusion 231d may be provided on the inner surface of the side wall 231a. The guide groove 223e may have a shape recessed inwards from the edge of the first plate 223a or the second plate 223b, and when the first plate 223a and the second plate 223b are coupled to each other, the first plate 223a and the second plate 223b may be aligned with each other in the linear reciprocating direction of the casing 203. The guide protrusion 231d may protrude from the inner surface of the side wall 231b and may extend in the linear reciprocating direction of the casing 203. For example, when the casing 203 is coupled to the pivoting structure 202, the guide protrusion 231d may be engaged with the guide groove 223e so as to guide the linear reciprocating of the casing 203.

According to various embodiments, in the state in which the casing 203 is mounted on the mast 213 via the pivoting structure 202, the elastic outer cover 209 (e.g., the elastic outer cover 113 in FIG. 1) may be coupled to the casing 203. In an embodiment, as illustrated in FIG. 4, a first portion 291 of the elastomer outer cover 209 may include a first fixing portion 291a surrounding the circumference of the casing 203, for example, at least the side wall 231b, and a second fixing portion 291b extending from the inner surface of the first fixing portion 291a. The second fixing portion 291b may be disposed to face an upper surface of the casing 202, for example, at least a portion of the upper casing 203b. For example, in the state in which the second fixing portion 291b is in contact with the outer surface of the upper casing 203b while the first fixing portion 291a surrounds the side surface of the casing 203, for example, the side wall 231b, the elastic outer cover 209 may be coupled to the casing 203.

According to various embodiments, the elastic outer cover 209 is made of an elastic material such as silicone, and may be stably coupled to the casing 203 even if a separate fixing structure is not provided. In an embodiment, the robot device 100 may further include a fixing plate 241 so as to more firmly fix the elastic outer cover 209 to the casing 203. The fixing plate 241 is a flat ring corresponding to the upper casing 203b, and may be fixed to the upper casing 203b. In an embodiment, the second fixing portion 291b may be fixed between the fixing plate 241 and the upper casing 203b. For example, the elastic outer cover 209 may be more firmly coupled to the casing 203 by the fixing plate 241 while being coupled to the casing 203 by its own elastic force.

According to various embodiments, in the state in which the first portion 291 is fixed, the second portion 293 of the elastic outer cover 209 (e.g., the lower end portion) may be coupled to the base 201. For example, the second portion 293 may be coupled so as to surround a portion of the outer surface of the base 201 and similar to the fixing plate 241, the second portion 293 may be provided with another fixing member so as to more firmly secure the second portion 293 to the base 201. When the elastic outer cover 209 is coupled to the casing 203 and the base 201, at least a portion of the mast 213 and/or at least a portion of the pivoting structure 202 or the casing 203 may be substantially accommodated in the inner space of the elastic outer cover 209 between the first portion 291 and the second portion 293. For example, the mechanical structures of the robot device 100 may be at least partially concealed by the elastic outer cover 209.

According to various embodiments, as the mast 213 moves on the base 201, the pivoting structure 202 or the casing 203 is movable with respect to the base 201. For example, as the mast 213 moves on the base 201, the first portion 291 is movable with respect to the second portion 293. As the first portion 291 moves with respect to the second portion 293, the elastic outer cover 209 is deformable, and the repulsive force of the elastic outer cover 209 generated by the deformation thereof may be alleviated by the pivotal movement of the pivoting structure 202 or the linear movement of the casing 203. For example, it is possible to prevent the repulsive force of the elastic outer cover 209 from applying a load to other structures or the driving device.

Figure 7:
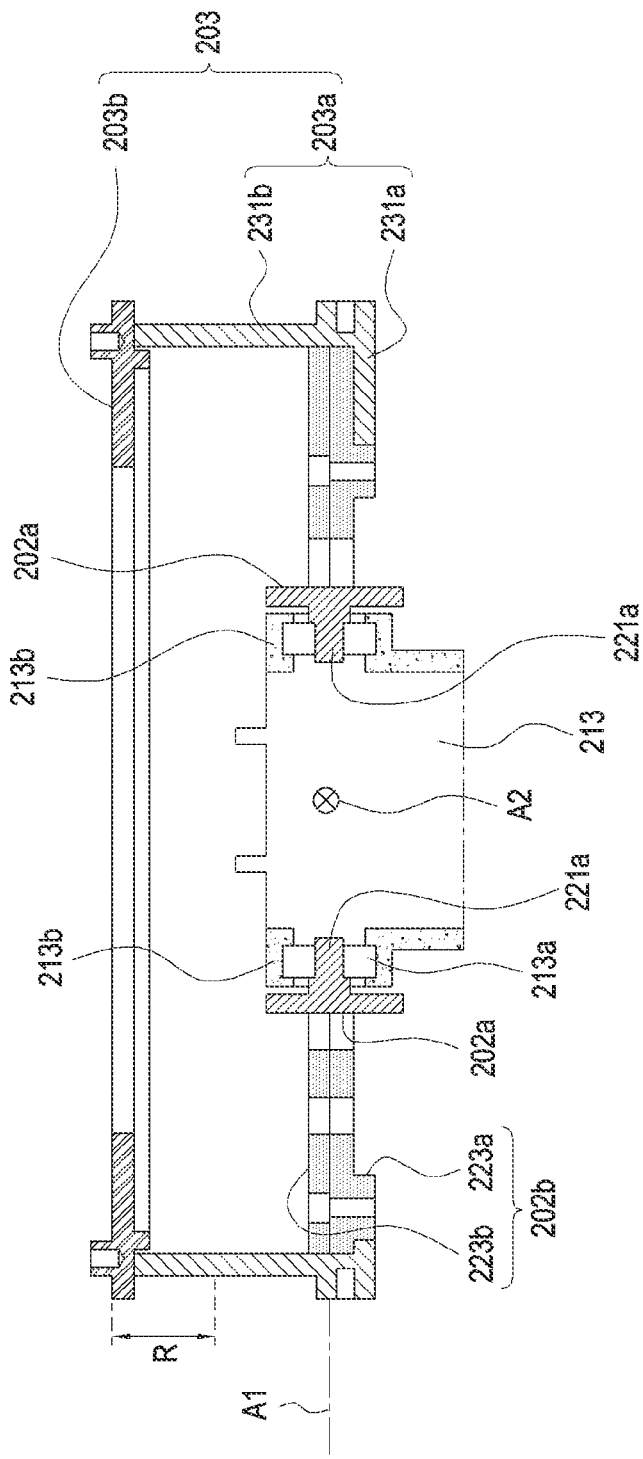
FIG. 7 is a cross-sectional view illustrating a configuration for explaining a pivoting structure or the structure of a casing in a robot device according to various embodiments.

FIG. 7 is a cross-sectional view illustrating a configuration for explaining the pivoting structure 202 or the structure of the casing 203 in a robot device (e.g., the robot device 100 in FIG. 1) according to various embodiments.

Further Referring to FIG. 7, the pivoting structure 202 may pivot the casing 203 about the second axis A2 while rotating about the first axis A1 with respect to the mast 213. For example, the casing 203 may be located to be inclined in various directions with respect to the mast 213 or the base 201. The configuration for alleviating or preventing the repulsive force of the elastic outer cover 209 by pivoting the pivoting structure 202 or the casing 203 have been described above. In an embodiment, when the elastic member 225b of FIGS. 2 and 3 is not present, the casing 203 is capable of linearly reciprocating with respect to the pivoting structure within a range allowed by the distance between the pivoting structure 202 and the upper casing 203b. In the structure in which the elastic member 225b is not present, the position of the casing 203 with respect to the pivoting structure 202 may be determined by the repulsive force or the restoring force provided by the elastic outer cover 209. In the structure in which the elastic member 225b is disposed, the range R in which the casing 203 is capable of linearly reciprocating may be slightly smaller than that in the structure in which the elastic member 225b is not present. In the structure in which the elastic member 225b is disposed, the position of the casing 203 with respect to the pivoting structure 202 may be determined by the repulsive force or the restoring force provided by the elastic outer cover 209 and the elastic force of the elastic member 225b.

Figure 8:
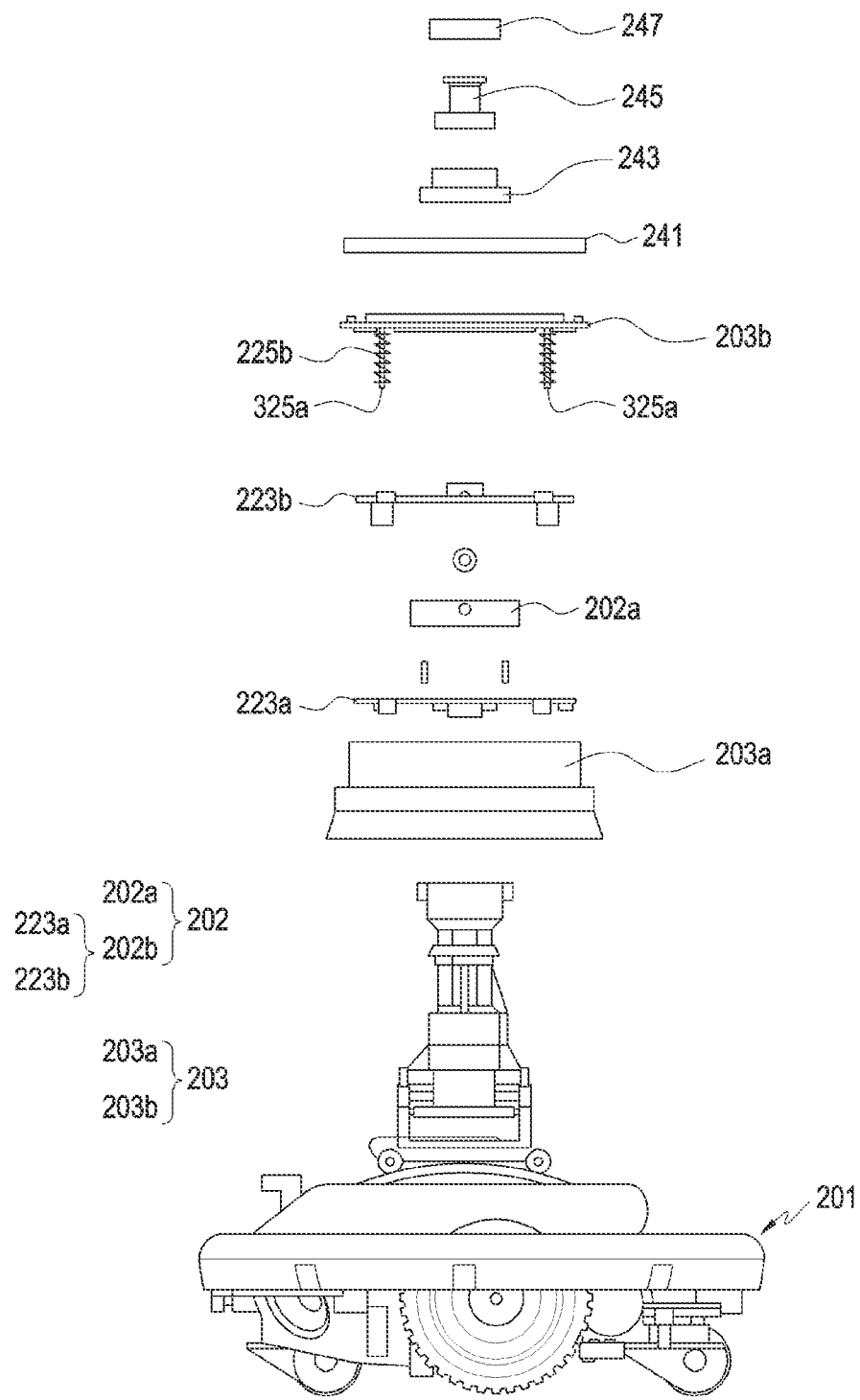
FIG. 8 is an exploded side view illustrating a robot device according to various embodiments.
Figure 9:
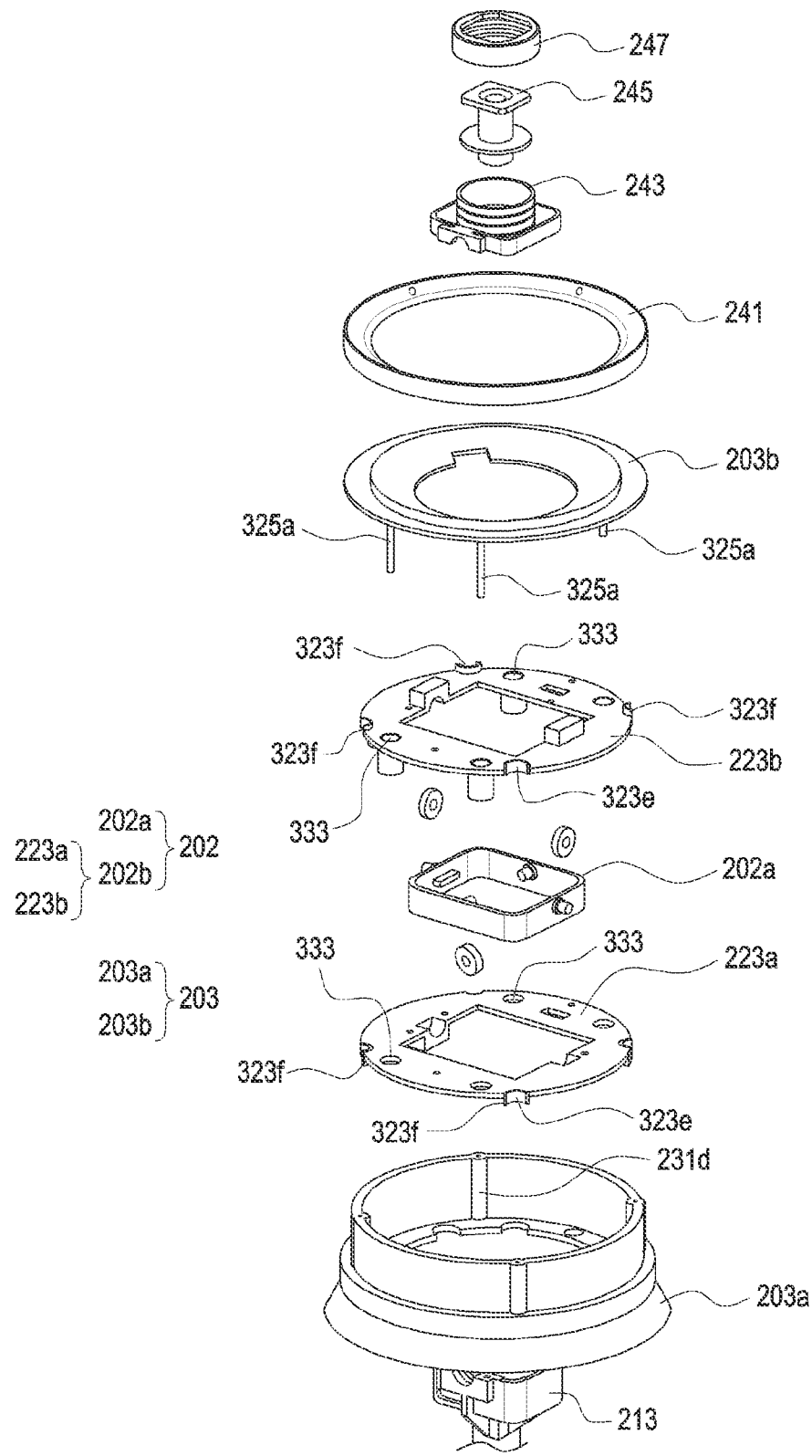
FIG. 9 is an exploded perspective view illustrating a part of a robot device according to various embodiments.

FIG. 8 is an exploded side view illustrating a robot device (e.g., the robot device 100 of FIG. 1) according to various embodiments in a partially disassembled state. FIG. 9 is an exploded perspective view illustrating a part of a robot device (e.g., the robot device 100 in FIG. 1) according to various embodiments.

The embodiment of FIGS. 8 and 9 is different from the previous embodiments in the shapes of some component or the structures for providing support pins 325a (e.g., the support pins 225a in FIG. 3) and avoidance holes 333 (e.g., the avoidance holes 233 in FIG. 3). Therefore, in describing the present embodiment, a configuration different from that of the preceding embodiments will be described.

Referring to FIGS. 8 and 9, at least one of the support pins 325a may extend downwards from the upper casing 203b, and although not illustrated, elastic members such as compression coil springs (e.g., the elastic members 225 in FIG. 3) may be disposed in the form of being wound around the support pins 325a, respectively. The avoidance holes 333 may penetrate the pivoting structure 202, for example, the first plate 223a and the second plate 223b at positions corresponding to the support pins 325a. The support pins 325a may be partially accommodated in the avoidance holes 333, respectively. An elastic member (e.g., the elastic member 225b in FIG. 3) may be wound around each support pin 325a, and opposite ends thereof may be supported by the second plate 223b and the upper casing 203b, respectively.

One end of the elastic member 225b may be supported by the second support plate 223b around corresponding one of the avoidance holes 333.

According to various embodiments, as the casing 203 linearly reciprocates with respect to the pivoting structure 202, the support pins 325a may protrude to the outside of the casing 203. In the present embodiment, the support pins 325a may protrude below the casing 203 through the pivoting structure 202. For example, even if the support pins 325a protrude to the outside of the casing 203, the support pins 325a are located in the space surrounded by the elastic outer cover (e.g., the elastic outer cover 113 or 209 of FIG. 1 or FIG. 4), the support pins 325a may not be exposed to the outside of the body portion 101 of FIG. 1 (e.g., the body portion 101 in FIG. 1).

According to various embodiments, the robot device (e.g., the robot device 100 in FIG. 1) may further include at least one guide rib 323f. The guide rib 323f may extend downwards from the first plate 223a or upwards from the second plate 223b. The guide ribs 323f may be used as a structure for defining a guide groove 323e (e.g., the guide groove 223e in FIG. 3). For example, in the linear reciprocating direction of the casing 203, the guide groove 323e may be longer than the guide groove 223e in FIG. 3. In an embodiment, the guide protrusion 231d formed on the casing 203 is engaged with the guide groove 323e, and is capable of guiding the linear reciprocating of the casing by reciprocating linearly in the state of being surrounded by the guide rib 323f.

Figure 10:
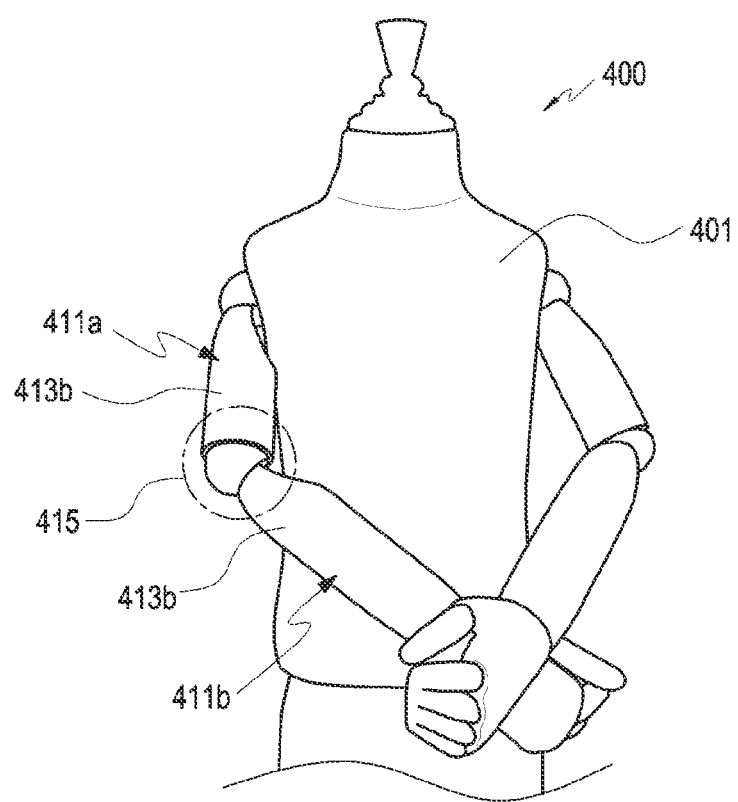
FIG. 10 is a perspective view illustrating a robot device according to various embodiments.

FIG. 10 is a perspective view illustrating a robot device 400 according to various embodiments.

Referring to FIG. 10, the robot device 400 has a shape simulating a human body, and may move in a bipedal or quadrupedal manner. In an embodiment, the robot device 400 may include link portions 411a and 411b that implement the same or similar motions as those of human arms. The link portions 411a and 411b may include elastic outer covers 413a and 413b similar to the body portion 101 in the robot device 100 of FIG. 1. According to an embodiment, first link portions 411a of the link portions may be connected to respective second link portions 411b of the link portions via respective joint structures 415. Each of the first link portions 411a may be rotatably coupled to the body portion 401 via another joint structure.

According to various embodiments, each of the joint structures 415 may include at least the pivoting structure 202 of FIG. 3. In an embodiment, each first link part 411a may have a mast having the same structure as the mast 213 of FIG. 3, and each second link part 411b may include another mast to be coupled to the second fixing member 245 or the third fixing member 247 of FIG. 3. For example, the masts of the second link portions 411b are pivotably connected to respective masts of the first link portions 411a via respective joint structures 415 (e.g., the pivoting structure 202 or the casing 203 of FIG. 3). In an embodiment, separately from the joint structures 415, the robot device 400 may be additionally provided with the pivoting structure 202 and the casing 203 of FIG. 3 to each of the first link portions 411a or each of the second link portions 411b, and at least one of the elastic outer covers 413a and 413b may be coupled to an additionally provided casing.

According to various example embodiments disclosed herein, a robot device (e.g., the robot device 100 or 400 in FIG. 1 or FIG. 10) may include: a mast (e.g., the mast 117 or 213 in FIGS. 1 to 3) extending in a direction; a pivoting structure (e.g., the pivoting structure 202 in FIGS. 2 to 4) including a pivot mounted on one end portion of the mast and configured to pivot with respect to the mast; a casing (e.g., the casing 203 in FIGS. 2 to 4) accommodating at least a portion of the pivoting structure and configured to linearly reciprocate with respect to the pivoting structure in a direction parallel or inclined to the direction in which the mast extends; and an elastic outer cover (e.g., the elastic outer cover 113 or 209 in FIG. 1 or FIG. 4) accommodating at least a portion of the mast and including a first portion (e.g., the first portion 291 in FIG. 4) fixed to the casing.

According to various example embodiments, the mast may include a hollow tube.

According to various example embodiments, the pivoting structure may include: a first pivoting frame (e.g., the first pivoting frame 202a in FIGS. 2 to 4 or FIG. 7) mounted on one end portion of the mast and configured to pivot with respect to the mast about a first axis (e.g., the first axis A1 in FIG. 2 or FIG. 7); and a second pivoting frame (e.g., the second pivoting frame 202b in FIGS. 2 to 4 or FIG. 7) mounted on the first pivoting frame and configured to pivot with respect to the first pivoting frame about a second axis (e.g., the second axis A2 in FIG. 2 or FIG. 7) perpendicular to the first axis. The second pivoting frame may include an opening (e.g., the opening 223d in FIG. 3) accommodating the first pivoting frame.

According to various example embodiments, the casing may include: a lower casing (e.g., the lower casing 203a in FIGS. 2 to 4 or FIG. 7) including a lower plate (e.g., the lower plate 231a in FIGS. 2 to 4 or FIG. 7) facing the lower surface of the pivoting structure and a side wall (e.g., the side wall 231b in FIGS. 2 to 4 or FIG. 7) extending from the lower plate to define a space (e.g., the space 231c in FIG. 3) to accommodate the pivoting structure; and an upper casing (e.g., the upper casing 203b in FIGS. 2 to 4 or FIG. 7) having a plate shape and fixed to the upper end of the side wall in the state of facing the upper surface of the pivoting structure.

According to various example embodiments, the robot device described above may further include: at least one guide protrusion (e.g., the guide protrusion 231d in FIG. 3 or FIG. 4) protruding from an inner surface of the side wall and extending in a linear reciprocating direction of the casing; and at least one guide groove (e.g., the guide groove 223e in FIG. 3 or FIG. 4) provided at an edge of the pivoting structure. The guide protrusion may be engaged with the guide groove to guide the linear reciprocating of the casing.

According to various example embodiments, the robot device described above may further include: at least one support pin (e.g., the support pin 225a or 325a in FIG. 3 or FIG. 9) extending from any one of the pivoting structure or the upper casing in a linear reciprocating direction of the casing; and at least one avoidance hole (e.g., the avoidance hole 333 in FIG. 3 or FIG. 9) penetrating another of the pivoting structure or the upper casing. A portion of the support pin may be accommodated in the avoidance hole.

According to various example embodiments, the robot device described above may further include an elastic member comprising an elastic material (e.g., the elastic member 225b in FIGS. 2 to 4) including one end supported by the pivoting structure and the other end supported by the upper casing. The elastic member may provide an elastic force acting in a direction of moving the upper casing away from the pivoting structure in the linear reciprocating direction of the casing.

According to various example embodiments, the elastic member may include a compression coil spring disposed between the pivoting structure and the upper casing in a state of being wound around the support pin, and one of both ends of the elastic member may be supported around the avoidance hole.

The first portion (e.g., the first portion 291 in FIG. 4) of the elastic outer cover may include: a first fixing portion (e.g., the first fixing portion 291a in FIG. 4) surrounding at least a side surface of the casing, and a second fixing portion (e.g., the second fixing portion 291b in FIG. 4) extending from an inner surface of the first fixing portion and disposed to face an upper surface of the casing.

According to various example embodiments, the robot device disclosed above may further include a fixing plate (e.g., the fixing plate 241 in FIG. 4) fixed to the casing, and the second fixing portion may be fixed between the casing and the fixing plate.

According to various example embodiments, the robot device described above may further include a base (e.g., the base 111 or 201 in FIG. 1, FIG. 2, or FIG. 7) including a traveling device comprising a wheel embedded therein, and the mast may be mounted on the base to move linearly or curvilinearly with respect to the base.

According to various example embodiments, the robot device described above may further include a head (e.g., the head 102 in FIG. 1) mounted on the mast, and a display configured to output visual information through at least a portion of the head.

According to various example embodiments, the elastic outer cover may further include a second portion (e.g., the second portion 293 in FIG. 4) fixed to the base, and the mast or the pivoting structure may be accommodated in the inner space of the elastic outer cover between the first portion and the second portion.

According to various example embodiments, the elastic outer cover may be deformed as the mast moves with respect to the base, and as the elastic outer cover is deformed, the pivoting structure may pivot with respect to the mast or the casing may linearly move with respect to the pivoting structure.

According to various example embodiments disclosed herein, a robot device may include: a base including a traveling device comprising a drive motor embedded therein; a mast mounted on the base to be movable linearly or curvilinearly and extending in a direction; a pivoting structure including a pivot mounted on one end portion of the mast and configured to pivot with respect to the mast; a head mounted on the mast and including a display; a casing accommodating at least a portion of the pivoting structure and configured to linearly reciprocate with respect to the pivoting structure in a direction parallel or inclined to the direction in which the mast extends; and an elastic outer cover including a first portion fixed to the casing and a second portion fixed to the base and accommodating the mast or the pivoting structure between the first portion and the second portion. The casing may include: a lower casing including a lower plate facing a lower surface of the pivoting structure and a side wall extending from the lower plate to define a space to accommodate the pivoting structure; and an upper casing having a plate shape fixed to an upper end of the side wall in a state of facing an upper surface of the pivoting structure.

According to various example embodiments disclosed herein, a robot device may include: a mast extending in a direction; a pivoting structure including a pivot mounted on one end portion of the mast and configured to pivot with respect to the mast; a casing accommodating at least a portion of the pivoting structure and configured to linearly reciprocate with respect to the pivoting structure in a direction parallel or inclined to the direction in which the mast extends; and an elastic outer cover including a first portion fixed to the casing and configured to accommodate at least a portion of the mast. The pivoting structure may include a first pivoting frame mounted on one end portion of the mast and configured to pivot with respect to the mast about a first axis perpendicular to the direction in which the mast extends; and a second pivoting frame mounted on the first pivoting frame and configured to pivot with respect to the first pivoting frame about a second axis perpendicular to the first axis, the second pivoting frame including at least one guide groove at an edge thereof. The casing may include a lower casing including a lower plate facing the lower surface of the pivoting structure, a sidewall extending from the lower plate to define a space for accommodating the pivoting structure, and at least one guide protrusion protruding from the inner surface of the side wall and extending in the direction in which the casing linearly reciprocates; and an upper casing having a plate shape and fixed to the upper end of the side wall in the state of facing the upper surface of the pivoting structure. The guide protrusion may be engaged with the guide groove so as to guide the linear reciprocating of the casing.

According to various example embodiments, the robot device described above may further include a base including a traveling device including wheels embedded therein and a head mounted on the mast, and the mast may be mounted to be movable linearly or curvilinearly on the base. As the mast moves with respect to the base, the elastic outer cover is deformable, and the pivoting structure may pivot with respect to the mast according to the deformation of the elastic outer cover, or the casing may linearly reciprocate with respect to the pivoting structure.

According to various example embodiments, the elastic outer cover may further include a second portion fixed to the base, and the mast or the pivoting structure may be accommodated in the inner space of the elastic outer cover between the first portion and the second portion.

According to various example embodiments, the first portion of the elastic outer cover may include a first fixing portion surrounding at least the side wall, and a second fixing portion extending from the inner surface of the first fixing portion and disposed to face the upper surface of the casing.

According to various example embodiments, the robot device described above may further include a fixing plate fixed to the upper casing, and the second fixing portion may be fixed between the upper casing and the fixing plate.

In the foregoing detailed description, various example embodiments have been described, but it will be evident to a person ordinarily skilled in the art that various modifications can be made without departing from the scope of the disclosure.

What is claimed is:

1. A robot device comprising:
   a mast extending in a direction;
   a pivoting structure, including a pivot, mounted proximate one end portion of the mast and configured to pivot with respect to the mast;
   a casing accommodating at least a portion of the pivoting structure and configured to linearly reciprocate with respect to the pivoting structure in a direction parallel or inclined to the direction in which the mast extends; and
   an elastic outer cover accommodating at least a portion of the mast and comprising a first portion fixed to the casing, wherein the casing comprises:
  a lower casing comprising a lower plate facing a lower surface of the pivoting structure and a side wall extending from the lower plate to define a space to accommodate the pivoting structure; and
  an upper casing having a plate shape and being fixed to an upper end of the side wall in a state of facing an upper surface of the pivoting structure,
wherein the robot device further comprises:
  at least one guide protrusion protruding from an inner surface of the side wall and extending in a linear reciprocating direction of the casing; and
  at least one guide groove provided at an edge of the pivoting structure, and
  wherein the at least one guide protrusion is engaged with the at least one guide groove to guide the linear reciprocating of the casing.

2. The robot device of claim 1, wherein the pivoting structure comprises:
  a first pivoting frame mounted on one end portion of the mast and configured to pivot with respect to the mast about a first axis; and
  a second pivoting frame mounted on the first pivoting frame and configured to pivot with respect to the first pivoting frame about a second axis perpendicular to the first axis,
  wherein the second pivoting frame comprises an opening accommodating the first pivoting frame.

3. The robot device of claim 1, further comprising:
  at least one support pin extending from any one of the pivoting structure or the upper casing in a linear reciprocating direction of the casing; and
  at least one avoidance hole penetrating another of the pivoting structure or the upper casing,
  wherein a portion of the at least one support pin is accommodated in the at least one avoidance hole.

4. The robot device of claim 3, further comprising:
  an elastic member comprising an elastic material and having one end supported by the pivoting structure and another end supported by the upper casing,
  wherein the elastic member is configured to provide an elastic force acting in a direction of moving the upper casing away from the pivoting structure in the linear reciprocating direction of the casing.

5. The robot device of claim 4, wherein the elastic member comprises a compression coil spring disposed between the pivoting structure and the upper casing and wound around the at least one support pin, and
  one of both ends of the elastic member is supported around the at least one avoidance hole.

6. The robot device of claim 1, wherein the first portion of the elastic outer cover comprises a first fixing portion surrounding at least a side surface of the casing, and a second fixing portion extending from an inner surface of the first fixing portion and disposed to face an upper surface of the casing.

7. The robot device of claim 6, further comprising:
  a fixing plate fixed to the casing,
  wherein the second fixing portion is fixed between the casing and the fixing plate.

8. The robot device of claim 1, further comprising:
  a base comprising a traveling device comprising a wheel embedded therein,
  wherein the mast is mounted on the base to move linearly or curvilinearly with respect to the base.

9. The robot device of claim 8, further comprising:
  a head mounted on the mast; and
  a display configured to output visual information through at least a portion of the head.

10. The robot device of claim 8, wherein the elastic outer cover further comprises a second portion fixed to the base, and
  the mast or the pivoting structure is accommodated in an inner space of the elastic outer cover between the first portion and the second portion.

11. The robot device of claim 8, wherein the elastic outer cover is configured to be deformed as the mast moves with respect to the base, and
  based on the elastic outer cover being deformed, the pivoting structure is configured to pivot with respect to the mast or the casing linearly moves with respect to the pivoting structure.

12. A robot device comprising:
  a base comprising a traveling device comprising a wheel embedded therein,
  a mast mounted on the base and configured to be movable linearly or curvilinearly and extending in a direction;
  a pivoting structure including a pivot mounted proximate an end portion of the mast and configured to pivot with respect to the mast;
  a head mounted on the mast and comprising a display;
  a casing accommodating at least a portion of the pivoting structure and configured to linearly reciprocate with respect to the pivoting structure in a direction parallel or inclined to the direction in which the mast extends; and
  an elastic outer cover comprising a first portion fixed to the casing and a second portion fixed to the base and accommodating the mast or the pivoting structure between the first portion and the second portion,
  wherein the casing comprises:
    a lower casing comprising a lower plate facing a lower surface of the pivoting structure and a side wall extending from the lower plate to define a space to accommodate the pivoting structure; and
    an upper casing having a plate shape fixed to an upper end of the side wall in a state of facing an upper surface of the pivoting structure,
  wherein the robot device further comprises:
    at least one guide protrusion protruding from an inner surface of the side wall and extending in a linear reciprocating direction of the casing; and
    at least one guide groove provided at an edge of the pivoting structure, and
    wherein the at least one guide protrusion is engaged with the at least one guide groove to guide the linear reciprocating of the casing.

13. The robot device of claim 12, further comprising:
  a fixing plate fixed to the upper casing,
  wherein the first portion of the elastic outer cover comprises a first fixing portion surrounding at least the side wall, and a second fixing portion extending from an inner surface of the first fixing portion and fixed between the upper casing and the fixing plate.

* * * * *